N. S. HOWELL.

Improvement in Animal Traps.

No. 120,877.    Patented Nov. 14, 1871.

Witnesses:
Chas. Nida
Francis McArdle

Inventor:
N. S. Howell
Per Munn & Co.
Attorneys.

UNITED STATES PATENT OFFICE.

NATHAN S. HOWELL, OF TUALATIN, OREGON.

IMPROVEMENT IN ANIMAL-TRAPS.

Specification forming part of Letters Patent No. 120,877, dated November 14, 1871.

*To all whom it may concern:*

Be it known that I, NATHAN S. HOWELL, of Tualatin, in the county of Washington and State of Oregon, have invented a new and Improved Animal-Trap; and I do hereby declare that the following is a full, clear, and exact description thereof, which will enable others skilled in the art to make and use the same, reference being had to the accompanying drawing forming part of this specification.

Figure 1:
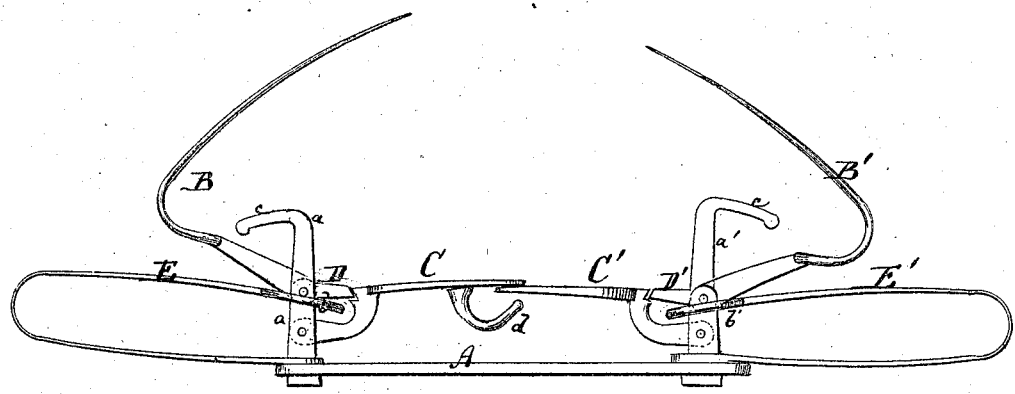
Figure 2:
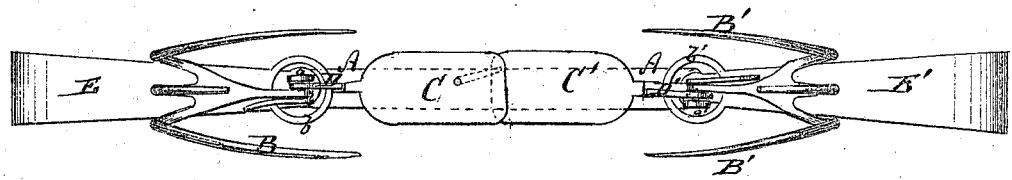

Figure 1 represents a side view of my improved animal-trap. Fig. 2 is a top view of the same.

Similar letters of reference indicate corresponding parts.

My invention consists in the arrangement of a trap having two pivoted toothed jaws, which catch and hold the animals by their bodies and absolutely prevent their escape.

A in the drawing is the base or lower platform of the trap, made, preferably, of a piece of strap-iron, with two posts, $a$ $a'$, at the ends. To these posts are, respectively, pivoted the shanks of the toothed jaws B B'. Each jaw has two or more pointed prongs, as shown, and is so set that said prongs point to those of the other jaw. To the posts are also pivoted the bait-platforms C and C', respectively, which are of such size that their ends overlap, as shown. D D' are the setting-levers, pivoted to the posts $a$ $a'$ above the pivots of the platforms C C'. The beveled or shouldered ends of the setting-levers are let into corresponding notches of the shanks of the platform when the trap is set, as shown on Fig. 1. E E' are the springs of the trap. They have loops $b$ $b'$ at their loose ends, said loops embracing the posts $a$ $a'$ under the shanks of the jaws and under the setting-levers D D'. A hook or projection, $c$, is formed at the upper end of each post, to prevent the loop from being thrown off by the power of the spring. When the trap is set the platforms C C' are placed horizontal, and the setting-levers D D' fitted into the notches so as to hold down the looped ends of the springs. The jaws are then folded back and apart, as shown. As soon as an animal steps on the platform C C' to take the bait there secured it will, by its weight, swing them down, thereby releasing the set-levers and causing the springs to fly up and throw the jaws forward toward each other, so that their prongs will enter the animal's body and hold it secure. The upper platform, C, has a hook, $d$, projecting from beneath, under the lower platform C', so that when the animal steps upon the latter it will cause it to press upon the hook and thereby swing both platforms simultaneously, as well as though the weight was first applied to the upper platform.

Having thus described my invention, I claim as new and desire to secure by Letters Patent—

1. The combination of the platforms C C', catch-levers D D', pivoted jaws B B', and springs E E' with each other, all arranged to constitute a trap, as set forth.

2. The hook $d$, affixed to the under side of the upper platform C to bear against the under side of the lower platform C', substantially as and for the purpose herein shown and described.

NATHAN S. HOWELL.

Witnesses:
 J. B. STONE,
 ISAAC BALL. (143)